United States Patent [19]

Liu et al.

[11] Patent Number: 5,046,999
[45] Date of Patent: Sep. 10, 1991

[54] 5-SPEED, COMPOUND, EPICYCLIC TRANSMISSION HAVING A PAIR OF PLANETARY GEAR SETS

[75] Inventors: Tyng Liu, Taipei, Taiwan; John D. Malloy, Troy, Mich.

[73] Assignee: General Motors Corporation, Detroit, Mich.

[21] Appl. No.: 593,420

[22] Filed: Oct. 5, 1990

[51] Int. Cl.[5] ............................................. F16H 3/58
[52] U.S. Cl. ................................................... 475/281
[58] Field of Search ............................... 475/280, 281

[56] References Cited

U.S. PATENT DOCUMENTS

| | | | |
|---|---|---|---|
| 3,106,107 | 10/1963 | Hardy | 475/281 |
| 4,802,385 | 2/1989 | Hiraiwa | 475/281 X |
| 4,944,719 | 7/1990 | Takahashi et al. | 475/281 |

*Primary Examiner*—Dirk Wright
*Attorney, Agent, or Firm*—Donald F. Scherer

[57] ABSTRACT

The present invention is directed to a five-speed, epicyclic transmission assembly having a compound planetary gear set encased in a common housing. Each planetary gear set has a sun gear and a ring gear. A plurality of pinion gears are operatively supported from a common carrier. The sun gears and ring gears of the two planetary gear sets are compounded by the operation of the pinion gears presented from the common carrier. Six, torque transfer devices are utilized. At least two of the torque transfer devices are input clutch members which selectively connect the input means to predetermined components of the planetary gear sets, and at least two of the torque transfer devices are reaction brake members that selectively ground predetermined components of the planetary gear sets to the housing. The sun gear in one of said planetary gear sets may be operatively connected to at least one of the input clutch members. The sun gear in the other planetary gear set is operatively connected to at least one of the input clutch member as well as to one of said reaction brake member. The carrier is operatively connected to one of the clutch member and one of said reaction brake members, and the ring gear in one of said planetary gear sets is connected to the output shaft.

10 Claims, 3 Drawing Sheets

FIG.-1

| GEAR | TORQUE RATIO | 28C | 28B | 28A | 38A | 38B | 58 | 38C |
|---|---|---|---|---|---|---|---|---|
| 1ST | 2.636 | X | | | | | X | |
| 2ND | 1.533 | X | | | X | | | |
| 3RD | 1.00 | X | X | | | | | |
| 4TH | 0.674 | | X | | X | | | |
| 5TH | 0.483 | | X | | | X | | |
| REV | 2.071 | | | X | | | | X |

5-SPEED, COMPOUND, EPICYCLIC TRANSMISSION HAVING A PAIR OF PLANETARY GEAR SETS

TECHNICAL FIELD

The present invention relates generally to automatic transmissions for vehicles. More particularly, the present invention relates to an epicyclic transmission assembly, wherein a pair of compound planetary gear sets provide five forward speeds and one reverse speed by selective actuation of one or more of a plurality of torque transfer devices in the nature of input clutch members and reaction brake members. Specifically, the present invention relates to a compound epicyclic transmission assembly having a pair of planetary gear sets that are interconnected by a succession of pinions which engage each other and selected sun and ring gears in the individual, planetary gear sets of the compound epicyclic transmission.

BACKGROUND OF THE INVENTION

The present invention relates to what is commonly designated as a five-speed automatic transmission that is particularly adapted for vehicular usage. That is, the transmission provides five forward speeds or gear ratios, and one reverse speed or gear ratio. By way of introduction, and to clarify the discussion which follows, the forward gear ratios are defined as those ratios which cause the vehicle to move forwardly and for simplicity, it will be assumed that the configuration of the planetary gear sets is such that in a forward gear ratio the output member rotates in the same direction as the input member. Conversely, the reverse ratio causes the vehicle to move rearwardly, and it will also be assumed that the output member rotates in a direction opposite to that of the input member.

As is also known, an input member is the connecting mechanism (normally a shaft in the transmission) which receives its driving force or torque from the vehicular engine—as through a well known torque converter—and imparts the driving torque to the planetary gear sets which comprise the epicyclic transmission. The also well known output member is that mechanism (normally also a shaft) which operatively connects the transmission to the differential from which the drive wheels are rotated.

"Torque transfer device" is another term commonly employed in the description of planetary gear sets. Two forms of torque transfer devices are commonly recognized—viz.: input clutch members and reaction brake members. An input clutch member is employed selectively to interconnect two members that are normally relatively rotatable so that they move in unison. A reaction brake member is employed selectively to preclude rotation of a member that is mounted so as be rotatable. Typically, a reaction brake member is presented from the housing in which the transmission is encased, and the reaction brake member thereby serves to "ground" a normally rotatable member to the housing so that member cannot rotate.

Most automatic transmissions known to the prior art would have required more than two planetary gear sets to achieve the five forward speeds or gear ratios provided by the present transmission.

A planetary gear set typically consists of a sun gear, which is a small gear located in the center of the planetary set, and a ring gear which, as the outermost member, circumscribes the set and has inwardly facing teeth. A plurality of planetary gears or pinions are interposed between the aforementioned sun and ring gears to be rotatable and/or circumferentially translatable. The pinions in each planetary gear set are normally supported from a carrier so that as the pinions translate the carrier will rotate in response to translation of the pinions. Conversely, the carrier may be rotated to effect a desired movement of the pinions. Rotation of the sun gear will cause all of the other elements in the planetary set to move, as well, unless one of the other of said elements is held stationary by a torque transfer device, such as a reaction brake member, which may be presented from the transmission housing. When a reaction brake member grounds one of the components in a planetary gear set to the housing, the grounded member will be forcibly held in position so that all the other members are movable relative thereto. Selectively grounding the members of a planetary gear set in combination with selectively connecting the input shaft to the desired component of the planetary gear set constitutes the typical means by which different gear ratios are achieved from a planetary gear set—i.e.: different members are selected to be rotated or grounded s the speed and direction of the output can be appropriately changed to accommodate the existing conditions.

There is, however, a limit to the number of variations which can be provided by a single planetary set. As a result, planetary gear sets have been compounded to provide a greater number of individual speeds or gear ratios. When planetary gear sets are compounded, various torque transfer devices are provided to effect selective interconnection between the members of the individual gear sets, as well as to ground one or more of the components of the gear sets to the transmission housing. These arrangements, while successful, do tend to increase the length of the housing required to encase not only the gear sets but also the torque transfer devices required to provide the desired number of gear ratios.

One rather unique arrangement for effecting the desired compounding for a pair of planetary gear sets was disclosed in U.S. Pat. No. 3,763,719 issued Oct. 9, 1973, to Malloy, and assigned to the assignee of the present invention. In that arrangement a pair of planetary gear sets was compounded by employing a unique commonality of the pinions. The arrangements disclosed in the aforesaid patent provides four forward gear ratios by the selective actuation of five torque transfer devices. That arrangement does not, however, provide five forward gear ratios.

SUMMARY OF THE INVENTION

It is, therefore, a primary object of the present invention to provide an improved five-speed transmission by compounding two planetary gear sets.

It is another object of the present invention to provide an improved five-speed transmission, as above, which may be readily incorporated in a housing having lesser overall dimensions than might be expected from the prior art.

It is a further object of the present invention to provide an improved five-speed transmission, as above, which employs a pair of planetary gear sets that are compounded by the interaction of pinion members supported from a common carrier, the pinions interacting with each other and with the sun and ring gears of the two planetary gear sets.

It is a still further object of the present invention to provide an improved five-speed invention, as above, wherein the compound planetary gear sets are operated by the selective actuation of six torque transfer devices.

It is an even further object of the present invention to provide an improved five-speed transmission, as above, wherein the six torque transfer devices include at least two input clutch members and at least two reaction brake members.

It is yet another object of this invention to provide an improved multi-speed power transmission having a compound planetary gear arrangement operatively connected between an input member and an output member and controlled by at least six torque transfer devices including at least two input clutch members operatively connected with a sun gear and a planet carrier, at least two brake members operatively connected with the sun gear and the planet carrier, and wherein the planetary gear arrangement has a ring gear continuously drivingly connected with the output member, another ring gear and another sun gear, each of which other ring and sun gears are operatively connected with torque transfer devices.

These and other objects of the invention, as well as the advantages thereof over existing and prior art forms, which will be apparent in view of the following detailed specification, are accomplished by means hereinafter described and claimed.

In general, an epicyclic transmission embodying the concepts of the present invention utilizes a pair of planetary gear sets encased in a common housing. Each planetary gear set has a sun gear and a ring gear. A plurality of pinions are operatively supported from a common carrier. The sun and ring gears of the two planetary gear sets are interengaged by the operation of the pinion gears presented from the common carrier.

Six torque transfer devices are employed in the subject transmission. At least two of those torque transmitting devices are in the nature of input clutch members that are selectively employed to effect a driving connection between relatively rotatable components of the two planetary gear sets, and at least two other of those torque transfer devices are in the nature of reaction brake members that are employed selectively to preclude rotation of otherwise rotatable components in the planetary gear sets by grounding the selected components to the transmission housing.

An input shaft is selectively connectible to components of the compound planetary gear sets through the input clutch members. Specifically, the sun gear in one of the planetary gear sets may be selectively connected to at least the input shaft, and the sun gear in the other planetary gear set may be selectively connected not only to the input shaft but also to ground through one of the reaction brake members. The carrier is also selectively connectible to the input shaft or to ground through one of the reaction brake members. The ring gear in one of the planetary gear sets is connected to the output shaft.

One exemplary embodiment and three alternative embodiments, of the present automatic five-speed epicyclic transmission, are described in sufficient detail to effect a full disclosure of the subject invention. It should also be understood that while the exemplary embodiments are described in detail, no attempt has been made to show or describe all of the various forms and modifications in which the invention might be embodied; the invention being measured by the appended claims and not by the details of the specification.

DESCRIPTION OF THE EXEMPLARY EMBODIMENTS

Primary Embodiment

Figure 1:
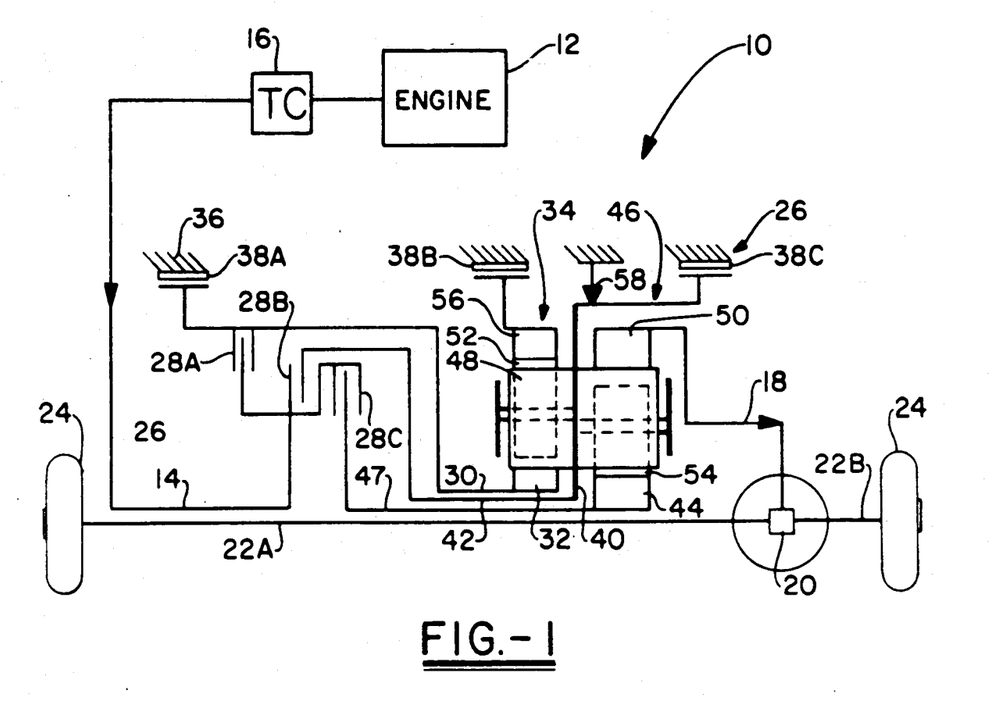
FIG. 1 is a schematic representation of one exemplary embodiment of a five-speed automatic transmission embodying the concepts of the present invention, the transmission not only having two planetary gear sets compounded by virtue of one specific pinion arrangement, but also incorporating six, selectively actuatable torque transfer devices to provide the desired gear ratios.

One representative form of an epicyclic or planetary transmission assembly embodying the concepts of the present invention is designated generally by the numeral 10 on FIG. 1. The representative transmission assembly 10, as is well known to the art, typically receives its input from an engine 12 that is drivingly connected to an input shaft 14 in the transmission assembly 10 through a torque converter 16. As is also commonly known, an output shaft 18 extends outwardly from the transmission assembly 10 and may be connected, as through a differential 20, to the vehicular left and right drive axles 22A and 22B from which the wheels 24 are presented.

The input shaft 14 of the transmission assembly 10 interacts with a plurality of torque transfer devices 26 which are preferably in the form of input clutch members 28.

In the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are a plurality of input clutch members which are generally identified by the numeral 28, but the specific, individual input clutch members are, therefore, identified as input clutch members 28A, 28B and 28C in the specification and on the drawings.

This same suffix convention shall be employed throughout the specification.

With continued reference to FIG. 1, the input shaft 14 is rotatably connected to a sun shaft 30 by the input clutch member 28A. The sun shaft 30 transfers input torque to the sun gear 32 of the first planetary gear set 34. The sun shaft 30 is also grounded to the housing 36 within which the transmission assembly 10 is encased by virtue of a torque transfer device 26 in the nature of a reaction brake member 38A. It is the use of the reaction brake member 38A which enables the sun gear 32 to be a reaction member when the reaction brake member 38A is actuated.

The input shaft 14 is also capable of rotating the carrier 40 by virtue of input clutch means 28B which selectively connects the input shaft 14 to the carrier shaft 42. Similarly, the input shaft 14 is capable of rotating the sun gear 44 of the second planetary gear set 46 by virtue of input clutch means 28C which drivingly connects the input shaft 14 to the second sun shaft 47.

By virtue of the structural arrangement defined to this point, it can be understood that driving torque from the input shaft 14 is introduced to the planetary gear sets 34 and 46 in the epicyclic transmission assembly 10 by either sun gear 32 or 44 or by the carrier 40.

The planetary gear sets 34 and 46 are incorporated into a compound gear arrangement by the pinions presented from the carrier 40, as follows. The sun gear 32 in the first planetary gear set 34 meshes directly with a long pinion 48 which also meshes directly with the ring gear 50 in the second planetary gear set 46. The long pinion 48 also meshes with two short pinions 52 and 54. The short pinion 52, in turn, meshes with the ring gear 56 in the first planetary gear set 34, and the short pinion 54, in turn, meshes with the sun gear 44 in the second planetary gear set 46. The long pinion 48 and the two short pinions 52 and 54 are all mounted on the carrier 40 for individual rotation, and yet when any of the pinions are circumferentially translated, that translation effects rotation of the carrier 40. It should also be noted that the ring gear 50 in the second planetary gear set 46 is the only component of the transmission assembly 10 that is directly connected to the output shaft 18. Hence, the long pinion 48 must either rotate or translate to effect an output from the transmission assembly 10, depicted in FIG. 1.

In the embodiment depicted in FIG. 1, there are two additional reaction brake members. Specifically, the ring gear 56 of the first planetary gear set 34 may be selectively grounded to the transmission housing 36 by a reaction brake member 38B, and the carrier 40 may be grounded to the housing 36 by a reaction brake member 38C.

The epicyclic transmission assembly 10 depicted in FIG. 1 can be controlled to provide the desired five forward gear ratios by selectively actuating or engaging the six torque transfer devices 26—viz.: by the three clutch input members 28A, 28B and 28C as well as by the three reaction brake members 38A, 38B and 38C. There is also a one-way torque transfer mechanism 58 in the embodiment depicted in FIG. 1 which is employed during normal operation to establish the carrier 40 as a reaction member. During a shift between the first and second ratio, the mechanism 58 provides for smooth shifting and accurate timing, since only one friction torque transfer drive interchange is required to complete the shift. This is a well known expedient utilized to provide smooth transmission operation.

Operation of the Primary Embodiment

Figure 2:
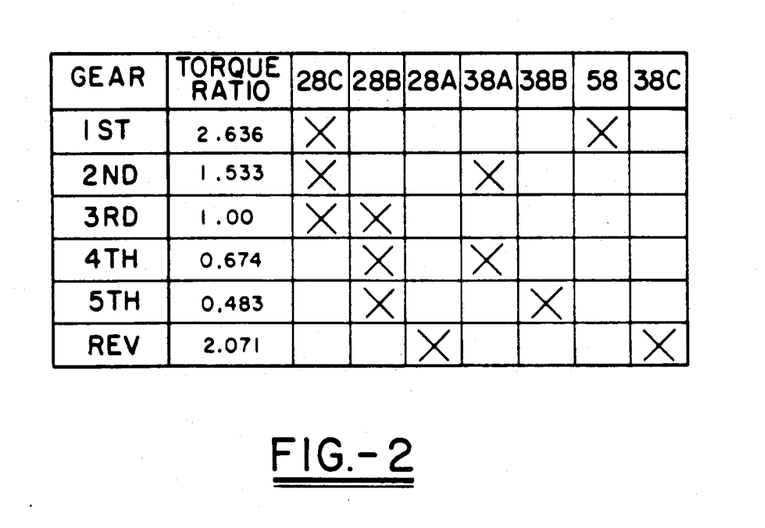
FIG. 2 is a table setting forth the sequencing of the torque transfer devices required to provide the five forward gear ratios and the single reverse ratio available from the transmission schematically depicted in FIG. 1.

To facilitate an understanding of the sequencing for the torque transfer devices 26 in order to achieve the desired succession of gear ratios, a sequencing chart is provided in FIG. 2. Those torque transfer devices 26—be they the input clutch members 28 or the reaction brake members 38—required to be actuated in order to achieve each gear ratio, are marked with an "X" on the table. Hence, for this embodiment one can refer not only to the detailed description which follows, but also to the table in FIG. 2 to determine which torque transfer devices must be actuated to achieve each gear ratio. FIG. 2 also includes exemplary torque ratios for each gear ratio in order that one might gain some understanding for a typical installation. Naturally, however, the number of teeth and the diameters of the various components in the planetary gear sets will affect the specific torque ratios achieved in any such transmission.

The first and highest gear ratio (lowest speed output) is established by engaging the input clutch member 28C. This creates a driving connection between the input shaft 14 and the second sun shaft 47 which drives sun gear 44 in the second planetary gear set 46. The mechanism 58 prevents reverse rotation of the carrier 40 to thereby establish the carrier 40 as a reaction member. In the alternative, the brake 38C can be engaged to establish the carrier 40 as a reaction member in the event that engine braking is desired. As such, the sun gear 44 is the input component of the transmission assembly 10 for this ratio.

Assuming a clockwise rotation for the input sun gear 44, the short pinion 54 in the second planetary gear set 46 will rotate counterclockwise, thereby forcing the long pinion 48 to rotate clockwise. Clockwise rotation of the long pinion 48 causes the output ring gear 50 to follow its rotation and itself rotate clockwise against the resistance between the wheels 24 and the road surface. The result is a forward movement of the vehicle at the lowest speed, and consequently at the highest torque applicable by the output shaft 18.

The second, forward gear ratio is achieved by engaging the reaction brake member 38A which causes the sun gear 32 to be established as a reaction member and the carrier 40 to be rotated forward, thus releasing the mechanism 58. If the brake 38C is engaged, the simultaneous interchange of brakes 38C and 38A will be accommodated by a conventional control mechanism. The purpose of the one-way shift timing brake 58 is to provide a means for maintaining a torque load on the transmission during the shift from the first to the second gear ratio such that the shift transition is smooth. The one-way shift timing brake 58 produces this result by preventing the carrier 40 from retro-rotating. As is known in this art, this effect can be provided by many different control means, including an electronic shifting system. The present invention utilizes a one-way brake for simplicity of operation but does not exclude the possibility of other means of achieving the same or a substantially similar result.

As a result of the foregoing actuating procedure, the sun gear 44 remains the input component of the transmission assembly 10, as in first gear ratio. Actuation of the reaction brake member 38A prevents the sun gear 32 from rotating by grounding it to the housing 36 so that it becomes a reaction component in the first planetary gear set 34. The sun gear 44, which is drivingly connected to the input shaft 14 through the input clutch member 28C, continues to rotate clockwise, as in the first gear ratio. This clockwise rotation of the sun gear 44 drives the short pinion 54 counterclockwise, thereby causing the long pinion 48 to rotate clockwise. This rotation of the long pinion 48 forces the long pinon 48 to translate around the sun gear 32 because it is held stationary by virtue of having been grounded to the housing 36 by the actuation of the reaction brake member 38A. The aforesaid translation and rotation causes the output ring gear 50 to rotate clockwise at a faster rate than in the first gear ratio, and that rotation is conveyed by the output shaft 18 to the wheels 24, creating a faster output speed than the first gear ratio with the application of a lower torque.

The third forward gear ratio is achieved by disengaging the reaction brake member 38A and engaging the input clutch member 28B. The input clutch member 28C remains engaged. This arrangement rotates the input sun gear 44 and the carrier 40 clockwise at the same rate. This rotation of the carrier 40 impels the long pinion 48 to translate clockwise, which drives the output ring gear 50 to rotate clockwise and transfer the input torque to the output shaft 18. Because the input sun gear 44 and the carrier 40 are rotating at the same rate, the short pinion 52 and the long pinion 48 will not be rotating on their own respective axes, but will simply translate circumferentially. Thus, the output ring gear 50 will rotate at the same rate and in the same direction as the input sun gear 44 and the carrier 40, creating an output which is in the same direction at the same speed, and which applies the same torque as the input shaft 14. A speed and torque ratio of 1.00 is commonly know in the art as direct drive—thereby making the third forward gear of the present invention a direct drive gear.

The fourth forward gear ratio is achieved by allowing the input clutch member 28B to remain engaged while disengaging the input clutch member 28C and engaging the reaction brake member 38A. The result of these changes is that the sun gear 32 is held stationary by the reaction brake member 38A, and the carrier 40 is rotated clockwise at the same rate as the input shaft 14. This causes the long pinion 48 which reacts against the stationary sun gear 32 to rotate clockwise about its own axis. The output ring gear 50, because it meshes directly with the long pinion 48, is forced to rotate clockwise in response to clockwise rotation of the long pinion 48. Because all of the force transmitting components of the transmission rotate in the same direction, the speed imparted from the sun gear 32 to the long pinion 48 and then to the output ring gear 50 is increased, although the torque is decreased proportionally. Thus, in this fourth gear ratio, the direction of rotation of the input and output members remain the same making it a forward gear, but the output speed is increased over that of the third forward gear ratio. Because the third forward gear ratio was direct drive (equal input and output speeds), this fourth gear ratio is an overdrive (greater output speed than input speed). The torque output is now also proportionally less than the input torque.

The fifth forward gear ratio is achieved by allowing the input clutch member 28B to remain engaged, while releasing the reaction brake member 38A and engaging the reaction brake member 38B. Maintaining engagement of the input clutch member 28B causes the carrier 40 to remain the input member, as in the fourth gear ratio. Actuation of the reaction brake member 38B causes the ring gear 56 to be a reaction member. Clockwise rotation of the carrier 40 not only forces the long pinion 48 to translate clockwise but also forces the short pinion 52 to walk or rotate about the stationary ring gear 56. The long pinion 48 which meshingly engages the short pinion 52 is thereby forced to rotate clockwise while it is translating. As such, the output ring ear 50 receives its input from the ling pinion 48 which is translating and rotating clockwise. This results in a rapid clockwise rotation of the output ring gear 50 and the imparts corresponding rotation to the output shaft 18. Thus, the fifth forward gear ratio has a faster output than the fourth gear ratio with the same input speed, and a corresponding lower torque ratio. This gear ratio is, in effect, a second overdrive.

The reverse gear ratio is achieved by the release of all torque transfer devices, and then simultaneously engaging the reaction brake member 38C and the input clutch member 28A. The release of all of the input clutch members and the reaction brake members is well known in this art as a neutral position which allows the engine to run but does not create any output from the transmission. Once the neutral state is achieved, the engagement of the two torque transfer devices, as will now be detailed, effects the reverse gear ratio.

Specifically, engagement of the input clutch member 28A causes the sun gear 32 to rotate clockwise with the input shaft 14. Engagement of the reaction brake member 38C grounds the carrier 40 so that it becomes a reaction member. Thus, the long pinion 48, which meshingly engages the sun gear 32, is forced to rotate counterclockwise. The output ring gear 50 which meshes with the long pinion 48, is driven counterclockwise by the long pinion 48. This results in counterclockwise rotation of the output shaft 18—opposite the clockwise rotation of the input shaft 14, thereby making this a reverse gear ratio. In reverse, the ratio of the speed out to the speed is low, but the torque ratio is concomitantly high.

A First Alternative Embodiment

Figure 3:
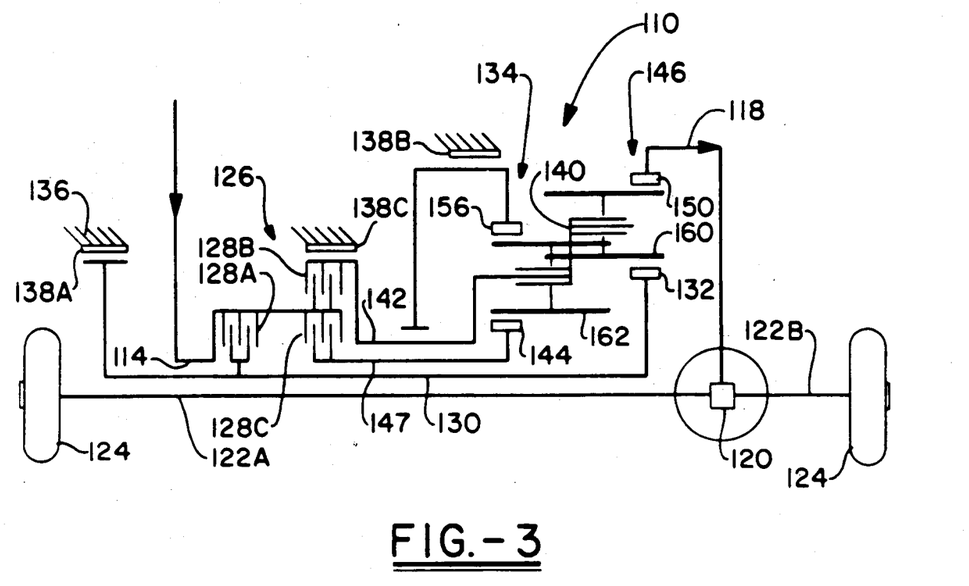
FIG. 3 is a schematic representation of a first alternative embodiment for an automatic five-speed epicyclic transmission embodying the concepts of present invention.

The first alternative embodiment of an epicyclic transmission assembly embodying the concepts of the present invention is depicted in FIG. 3 and is identified generally by the numeral 110. The transmission assembly 110, as is well known to the art, typically receives its input through an input shaft 114 in the transmission assembly 110. It is also commonly known that an output shaft 118 extends outwardly from the transmission assembly 110 and may be connected, as through a differential 120, to the vehicular left and right drive axles 122A and 122B from which the wheels 124 are presented.

The input shaft 114 of the transmission assembly 110 interacts with a plurality of torque transfer devices 126 which are preferably in the form of input clutch members 128.

With continued reference to FIG. 3, the input shaft 114 is rotatably connected to a sun shaft 130 by the input clutch member 128A. The sun shaft 130 transfers input torque to the sun gear 132 which, in this embodiment is incorporated in the second planetary gear set 146. The sun shaft 130 is also grounded to the housing 136 within which the transmission assembly 110 is encased by virtue of a torque transfer device 126 in the nature of a reaction brake member 138A. It is the use of the reaction brake member 138A which enables the sun gear 132 to be a reaction member when the reaction brake member 138A is actuated.

The input shaft 114 is also capable of rotating the carrier 140 by virtue of input clutch means 128B which selectively connects the input shaft 114 to the carrier shaft 142. Similarly, the input shaft 114 is capable of rotating the sun gear 144 which, in this embodiment, is incorporated in the first planetary gear set 134. The sun gear 144 is rotated when the sun shaft 147 attached thereto is selectively connected to the input shaft 114 by the input clutch means 128C.

By virtue of the structural arrangement defined to this point, it can be understood that, like the embodiment depicted in FIG. 1, driving torque from the input shaft 114 is introduced to the planetary gear sets 134 and 146 in the epicyclic transmission assembly 110 by either sun gear 132 or sun gear 144, or by the carrier 140.

The planetary gear sets 134 and 146 are compounded by the pinions presented from the carrier 140, as follows. A first long pinion 160 is interposed between, and meshes simultaneously with, both the sun gear 132 and the output ring gear 150 in the second planetary gear set 146. A second long pinion 162 is similarly interposed between, and meshes simultaneously with, both the sun gear 144 and the ring gear 156 in the first planetary gear set 134. In addition, the pinions 160 and 162 are themselves meshingly engaged.

The two long pinions 160 and 162 are both mounted on the carrier 140 for rotation, and yet when the pinions are circumferentially translated, that translation effects rotation of the carrier 140, or vice versa. It should also be noted that the ring gear 150 in the second planetary gear set 146 is the only component of the transmission assembly 110 that is directly connected to the output shaft 118. Hence, the long pinions 160 and 162 must either rotate or translate to effect an output from the transmission assembly 110 depicted in FIG. 3.

In the embodiment depicted in FIG. 3, there are two additional reaction brake members. Specifically, the ring gear 156 of the first planetary gear set 134 may be selectively grounded to the transmission housing 136 by a reaction brake member 138B, and the carrier 140 may be grounded to the housing 136 by a reaction brake member 138C.

The epicyclic transmission assembly 110, depicted in FIG. 3, can be controlled to provide the desired five forward gear ratios by the selective use of the six torque transfer devices 126—viz.: specifically by the three input clutch members 128A, 128B and 128C in various combinations with the three reaction brake members 138A, 138B and 138C.

Operation of the First Alternative Embodiment

Although the structure of the first alternate embodiment is different than the first embodiment, the function and means of operating the alternate embodiment are nearly identical. Specifically, then, to achieve the first forward ratio in the alternate embodiment, the input clutch member 128C and the reaction brake member 138C are engaged. The torque applied by the input shaft 114 is then transmitted by shaft 147 to sun gear 144 which rotates clockwise in response to clockwise rotation of the input shaft 114. Actuation of the reaction brake member 138C grounds the carrier 140 so it becomes a reaction member and thereby precludes the pinions 160 and 162 from translating. However, pinion 162 rotates counterclockwise in response to clockwise rotation of the sun gear 144, forcing the pinion 160 to rotate clockwise. This rotation of the pinion 160 effects clockwise rotation of the output ring gear 150 and provides torque to the output shaft 118 which rotates in the same direction as, but at a lower speed than, the input shaft 114.

The second forward gear ratio is established by allowing clutch 128C to remain engaged while disengaging reaction brake member 138C and engaging reaction brake member 138A. The result is that sun gear 144 remains the input component of the transmission assembly 110, and clockwise rotation of the sun gear 144 causes pinion 162 to rotate counterclockwise. This rotation of pinion 162 forces pinion 160 to rotate clockwise, and as it does so, the two pinions 160 and 162 translate because the sun gear 132, and the sun shaft 130, are held stationary by virtue of the engaged reaction brake member 138A. The aforesaid translation of the pinions 160 and 162 rotates the carrier 140 clockwise which imparts clockwise rotation of the output ring gear 150. Rotation of the output ring gear 150 is slightly faster than the output of the first gear ratio die to the rotation and translation of pinion 160. The torque output is also proportionally lower than that of the first embodiment.

To achieve the third, forward gear ratio with transmission assembly 110, input clutch member 128C remains engaged, but reaction brake member 138A is disengaged and input clutch member 128B is engaged. The engagement of the two input clutch members 128C and 128B forces shafts 142 and 147 to rotate clockwise at the same speed because they are both directly connected to the input shaft 114. This causes the input sun gear 144 and the carrier 140 to rotate at the same speed and in the same direction. As is well known in this art, when two elements of a planetary gear set rotate at the same speed, the other elements must also rotate at that speed. Thus, the output ring gear 150 and the output shaft 118 also rotate at this rate. This is known as a direct drive ratio, and as such, the input and output speeds, torques and direction of rotation are identical.

The fourth forward gear ratio is established by allowing the input clutch member 128B to remain engaged while disengaging the input clutch member 128C and engaging the reaction brake member 138A. Actuation of the reaction brake member 138A secures the sun gear 132 against rotation. Actuation of the input clutch member 128B effects clockwise rotation of the carrier 140 in response to clockwise rotation of the input shaft 114. The aforesaid rotation of the carrier 140 forces the pinion 160 to rotate clockwise about the stationary sun gear 132 and thereby drive the output ring gear 150 clockwise at the rate faster than the rotation of the carrier 140. Therefore, the fourth drive gear ratio constitutes an overdrive ratio, with the rotation of the output ring gear 150 being faster than the rotation of the input shaft 114, but delivering lesser torque.

The fifth forward gear ratio is achieved by allowing the input clutch member 128B to remain engaged, while disengaging reaction brake 138A and engaging reaction brake member 138B. This gear ratio, like the two gear ratios previously described, utilizes the carrier 140 as the input component of the transmission assembly 110. The fifth gear ratio utilizes the ring gear 156 as the reaction member. Thus, the carrier 140 provides the clockwise input and forces the pinion 162 to rotate counterclockwise within the grounded ring gear 156. Counterclockwise rotation of pinion 162 causes pinion 160 to rotate clockwise and thereby drive the output ring gear 150 clockwise. The fifth forward gear ratio is an even further overdrive, with the output gear 150 rotating still faster than the input shaft 114 but with an even further reduction in the output torque.

The transmission assembly 110 achieves the reverse gear ratio by disengaging all input clutch members and all reaction brake members and thereafter engaging the input clutch member 128A as well as the reaction brake member 138C. Engagement of the input clutch member 128A effects clockwise rotation to the sun shaft 130, and thus the sun gear 132, in response to clockwise rotation of the input shaft 114. Actuation of the reaction brake member 138C locks the carrier 140 against rotation, which precludes translation of the pinions 160 and 162 while forcing each to rotate about its own axis. Thus, clockwise rotation of the sun gear 132 forces pinion 160 to rotate counterclockwise. Counterclockwise rotation of the pinion 160 forces counterclockwise rotation of the output ring gear 150. Hence, the ring gear 150 rotates oppositely than the input shaft 114 (therefore a reverse gear) and at a much higher torque than applied by the input shaft 114.

A Second Alternative Embodiment

Figure 4:
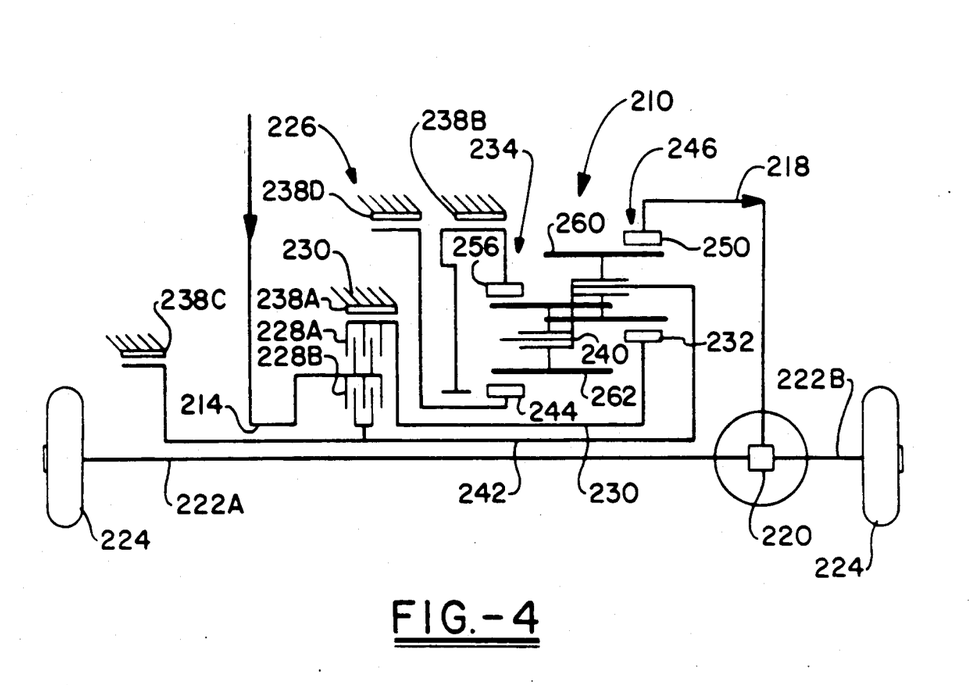
FIG. 4 is a schematic representation of a second alternative embodiment for an automatic five-speed epicyclic transmission embodying the concepts of the present invention.

The second alternative embodiment, of an epicyclic transmission assembly embodying the concepts of the present invention, is depicted in FIG. 4 and is identified generally by the numeral 210. The transmission assembly 210, as is well known to the art, typically receives its input through an input shaft 214 in the transmission assembly 210. As is also commonly known, an output shaft 218 extends outwardly from the transmission assembly 210 and may be connected, as through a differential 220, to the vehicular left and right drive axles 222A and 222B from which the wheels 224 are presented.

The input shaft 214 of the transmission assembly 210 interacts with a plurality of torque transfer devices 226 which are preferably in the form of input clutch members 228.

With continued reference to FIG. 4, the input shaft 214 is rotatably connected to a sun shaft 230 by the input clutch member 228A. The sun shaft 230 transfers input torque to the sun gear 232 which, in this embodiment is also incorporated in the second planetary gear set 246. The sun shaft 230 is also grounded to the housing 236 within which the transmission assembly 210 is encased by virtue of a torque transfer device 226 in the nature of a reaction brake member 238A. As in the previously described embodiments, it is the use of the reaction brake member 238A which enables the sun gear 232 to be a reaction member when the reaction brake member 238A is actuated.

The input shaft 214 is also capable of rotating the carrier 240 by virtue of input clutch means 228B which selectively connects the input shaft 214 to the carrier shaft 242.

By virtue of the structural arrangement defined to this point, it can be understood that driving torque from the input shaft 214 is introduced to the planetary gear set 246 in the epicyclic transmission assembly 210 by either sun gear 232 or by the carrier 240.

The planetary gear sets 234 and 246 are compounded by the pinions presented from the carrier 240, as follows. A first long pinion 260 is interposed between, and meshes simultaneously with, both the sun gear 232 and the output ring gear 250 in the second planetary gear set 246. A second long pinon 262 is similarly interposed between, and meshes simultaneously with, both the sun gear 244 and the ring gear 256 in the first planetary gear set 234. In addition, the pinions 260 and 262 are themselves meshingly engaged.

The two long pinions 260 and 262 are both mounted on the common carrier 240 for rotation, and yet when the pinions are circumferentially translated, that translation effects rotation of the carrier 240, or vice versa. It should also be noted that the ring gear 250 in the second planetary gear set 246 is the only component of the transmission assembly 210 that is directly connected to the output shaft 218. Hence, the long pinions 260 and 262 must either rotate or translate, to effect an output from the transmission assembly 210 depicted in FIG. 4.

In the embodiment depicted in FIG. 4, there are three additional torque transfer devices in the nature of reaction brake members. Specifically, the ring gear 256 of the first planetary gear set 234 may be selectively grounded to the transmission housing 236 by a reaction brake member 238B, the carrier 240 may be selectively grounded to the housing 236 by a reaction brake member 238C and the sun gear 244 may be selectively grounded to the housing 236 by a reaction brake member 238D.

It should be noted that the epicyclic transmission assembly 210 depicted in FIG. 4 has only two input clutch members 228A and 228B, but there are a total of six torque transfer devices—the remaining four being the reaction brake members 238A through 238D, inclusive. That combination of torque transfer devices can also effect the desired five, forward gear ratios, as follows.

Operation of the Second Alternative Embodiment

Operation of this second alternate embodiment is similar in many ways to the first two embodiments, but there are specific differences. To establish the first forward gear ratio of the embodiment depicted in FIG. 4, the input clutch 228A and the reaction brake member 238D are actuated. The input shaft 214, which is assumed to be rotating in the clockwise direction, as with the previous embodiments, rotates the shaft 230, through the actuated input clutch member 228B, to rotate the input sun gear 232 clockwise. Clockwise rotation of the sun gear 232 forces the meshing pinion 260 to rotate counterclockwise. Actuation of the reaction brake member 238D grounds the sun gear 244, and as a result, the pinion 262 is forced to translate clockwise about the sun gear 244. The combined rotation and translation of the pinions 260 and 262 drives the output ring gear 250 clockwise, forcing rotation of the output shaft 218 which is in the same direction as the input shaft 214, but at a slower speed and higher torque.

The second forward gear ratio is established by disengaging the input clutch member 228A and engaging the input clutch member 228B. The reaction brake member 238D maintains the sun gear 244 grounded to the housing 236, and actuation of clutch 228B causes the carrier 240 to rotate clockwise with the input shaft 214. Clockwise rotation of the carrier 240 forces the pinions 260 and 262 to translate clockwise, and because the sun gear 244 is grounded, clockwise translation of the pinion 262 causes the pinion 262 to rotate clockwise about its own axis. The meshing interengagement of the pinions forces pinion 260 to rotate counterclockwise, even as it translates clockwise. The combined clockwise translation and counterclockwise rotation provides a net result which effects clockwise rotation of output ring gear 250 at a rate greater than that delivered by the first forward gear ratio, but lesser than the rate at which the carrier 240 and the input shaft 214 is being rotated.

The third forward gear ratio is established by disengaging the reaction brake member 238D and engaging the input clutch member 228A. This sequence results in both input clutch members 228A and 228B being engaged to effect rotation of the sun gear 232 and the carrier 240 in the same direction and at the same speed. As is well known in this art, when two components of a planetary gear set rotate at the same speed, the other components must also rotate at that speed. Thus, the output ring gear 250 and the output shaft 218 rotate in the same direction and at the same speed as the input shaft 214. The third, forward gear ratio is thus a direct drive.

The fourth forward gear ratio is achieved by disengaging the input clutch member 228A and actuating the reaction brake member 238A. The input clutch member 228B remains actuated such that the carrier 240 continues to be the input component. Actuation of the brake member 238A grounds the sun gear 232. The resulting clockwise rotation of the carrier 240 in response to clockwise rotation of the input shaft 214 forces the pinion 260 to rotate clockwise against the grounded sun gear 232. In this actuating configuration, the output ring gear 250 is forced to rotate clockwise with the combined rotational and translational speed of pinion 260. As such, the output ring gear 250 imparts a rotation to the output shaft 218 that is in the same direction as that of the input shaft 214, but at a speed which is greater than that of the input shaft 214. The fourth forward gear ratio is thus the first overdrive ratio provided by the embodiment depicted in FIG. 4.

The fifth forward gear ratio is established by disengaging the reaction brake member 238A and actuating the reaction brake member 238B. The input clutch member 228B remains actuated so that the carrier 240 continues to be the input member in this gear ratio. The reaction brake member 238B grounds the ring gear 256. Clockwise rotation of the carrier 240 with the input shaft 214 thereby effects clockwise translation of the pinions 260 and 262. Because the pinion 262 meshingly engages the grounded ring gear 256, translation of the pinion 262 forces it to rotate counterclockwise. This counterclockwise rotation of the pinion 262, in turn, imparts clockwise rotation to the meshingly engaged pinion 260. The combined rotation and translation of the pinion 260 effects still faster rotation of the output ring gear 250 in the same direction as the input shaft 214 to provide a second overdrive.

The reverse gear ratio is achieved by first disengaging the previously actuated torque transfer devices 226 and then engaging the input clutch member 228A and the reaction brake member 238C. Actuation of the input clutch member 228A rotates the sun gear 232 clockwise with the input shaft 214. Actuation of the reaction brake member 238C grounds the carrier 240 so that clockwise rotation of the sun gear 232 causes the pinion 260 to rotate counterclockwise. Because the output ring gear 250 is being driven by the pinion 260, the output ring gear 250 also rotates counterclockwise to provide reverse rotation of the output shaft 218 at a low speed but with a relatively high torque.

A Third Alternative Embodiment

Figure 5:
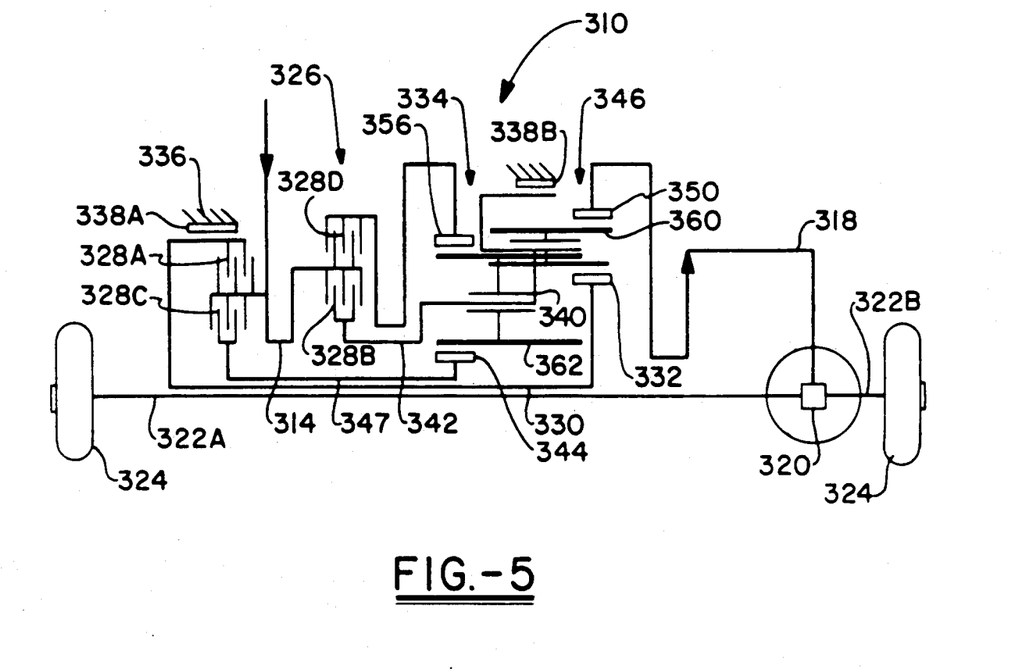
FIG. 5 is a schematic representation of a third alternative embodiment for an automatic five-speed epicyclic transmission embodying the concepts of the present invention.

The third alternative embodiment of an epicyclic transmission assembly embodying the concepts of the present invention is depicted in FIG. 5, and is identified generally by the numeral 310. The transmission assembly 310, as is well known to the art, typically receives its input through an input shaft 314 in the transmission assembly 310. It is also commonly known that an output shaft 318 extends outwardly from the transmission assembly 310 and may be connected, as through a differential 320, to the vehicular left and right drive axles 322A and 322B from which the wheels 324 are presented.

The input shaft 314 of the transmission assembly 310 interacts with a plurality of torque transfer devices 326 which are preferably in the form of input clutch members 328.

With continued reference to FIG. 5, the input shaft 314 is rotatably connected to a sun shaft 330 by the input clutch member 328A. The sun shaft 330 transfers input torque to the sun gear 332 which, in this embodiment, is also incorporated in the second planetary gear set 346. The sun shaft 330 is also grounded to the housing 336 within which the transmission assembly 310 is encased by virtue of a torque transfer device 326 in the nature of a reaction brake member 338A. As in the previously described embodiments, it is the use of the reaction brake member 338A which enables the sun gear 332 to be a reaction member when the reaction brake member 338A is actuated.

The input shaft 314 is also capable of rotating the carrier 340 by virtue of input clutch means 328B which selectively connects the input shaft 314 to the carrier shaft 342.

By virtue of the structural arrangement defined to this point it, can be understood that driving torque from the input shaft 314 is introduced to the planetary gear sets 334 and/or 346 in the epicyclic transmission assembly 310 by either sun gear 332 or by the carrier 340. The planetary gear sets 334 and 346 are compounded by the pinions presented from the common carrier 340, as follows. A first long pinion 360 is interposed between, and meshes simultaneously with, both the sun gear 332 and the output ring gear 350 in the second planetary gear set 346. A second long pinon 362 is similarly interposed between, and meshes simultaneously with, both the sun gear 344 and the ring gear 356 in the first planetary gear set 334. In addition, the pinions 360 and 362 are themselves meshingly engaged.

The two long pinions 360 and 362 are both mounted on the common carrier 340 for rotation, and yet when the pinions are circumferentially translated, that translation effects or results from, rotation of the carrier 340. It should also be noted that the ring gear 350 in the second planetary gear set 346 is the only component of the transmission assembly 310 that is directly connected to the output shaft 318. Hence, the long pinions 360 and 362 must either rotate or translate, to effect an output from the transmission assembly 310 depicted in FIG. 5.

In the embodiment depicted in FIG. 5 there is one additional reaction brake member. Specifically, the carrier 340 may be selectively grounded by virtue of a reaction brake member 338B which grounds the carrier 340 to the housing 336. This embodiment also has two additional input clutch members 328. Specifically, an input clutch member 328C selectively interconnects the input shaft 314 to the sun gear 344 of the first planetary gear set 334 through the shaft 347, and an input clutch member 328D selectively interconnects the ring gear 356 to the input shaft 314.

It should be noted that the epicyclic transmission assembly 310 depicted in FIG. 5 has only two reaction brake members 338A and 338B, but there are a total of six torque transfer devices—the remaining four being the input clutch members 328A through 328D, inclusive. That combination of torque transfer devices can also effect the desired five forward gear ratios, as follows.

Operation of the Third Alternative Embodiment

To establish the first forward gear ratio of the third embodiment, as depicted in FIG. 5, the input clutch member 328C and the reaction brake member 338B are actuated. Actuation of the input clutch member 328C rotates the sun gear 344 clockwise with the input shaft 14. This rotation of the sun gear 344 rotates the meshingly engaged pinion 362 counterclockwise. However, any translation of the pinion 362 is precluded by virtue of the fact that the carrier 340 has been grounded by the reaction brake member 338B. Therefore, counterclockwise rotation of pinion 362 causes pinion 360 to rotate clockwise and thereby force the output ring gear 350 to rotate the output shaft 318 clockwise at a slower speed than the input shaft 314, but at a higher torque.

The second forward gear ratio is established by disengaging the reaction brake member 338B and engaging reaction brake member 338A. The input clutch member 328C continues to provide a driving input to the sun gear 344, but now the carrier 340 is free to rotate. Actuation of the reaction brake member 338A grounds the sun gear 332. Clockwise rotation of the sun gear 344 in response to clockwise rotation of the input shaft 314 rotates the meshingly engaged pinion 362 counterclockwise and imparts clockwise rotation of the pinion 360. Because the sun gear 332 is grounded, the clockwise rotation of the pinion 360 effects clockwise translation of the pinion 360. This clockwise rotation of the pinion 360 drives the output ring gear 350 clockwise and provides clockwise rotation to the output shaft 318. The output shaft 318 rotates in the same direction as the input shaft 314, but slightly faster than the previous gear ratio and with lesser torque.

The third forward gear ratio is achieved by disengaging the reaction brake member 338A and actuating the input clutch member 328B. The previously actuated input clutch member 328C continues to effect rotation to the sun gear 344, while the input clutch member 328B now imparts the same rotational speed to the carrier 340. As a result, the sun gear 344 and the carrier 340 both rotate in the same direction and at the same rate. As previously discussed herein, when two components of a planetary gear set rotate at the same speed, the other component must also rotate at that same speed. Thus, under the conditions described for this third, forward gear ratio the output ring gear 350 rotates clockwise at the same speed as the driven sun gear 344 and the carrier 340. As such, the output shaft 318 rotates in the same direction and at the same speed as the input shaft 314 so once again the third forward gear ratio is the direct drive selection.

The fourth forward gear ratio is established by disengaging the input clutch member 328C and actuating the reaction brake member 338A. Maintaining the engagement of the input clutch member 328B effects continued clockwise rotation of the carrier 340 in response to clockwise rotation of the input shaft 314. Actuation of the reaction brake member 338A grounds the sun gear 332. With the sun gear 332 grounded, rotation of the carrier 340 forces the pinion 360 to rotate clockwise. Therefore, the net effect to the output ring gear 350 is a combination of clockwise rotation and translation by the pinion 360. The output ring gear 350 thereby imparts a rotational speed to the output shaft 318 which is faster than the rotational speed of the input shaft 314. This is the first overdrive ratio for the embodiment depicted in FIG. 5.

The fifth forward gear ratio in this embodiment is established by disengaging the input clutch member 328B and engaging the input clutch member 328D. As such, the ring gear 356 becomes the input member. Actuation of the reaction brake member 338A is maintained so the sun gear 332 is retained as the reaction member.

With the sun gear 332 grounded, the clockwise rotation of the carrier 340 causes the pinion 360 to rotate clockwise as it walks about the fixed sun gear 332. That clockwise rotation of the pinion 360 imparts counterclockwise rotation to the pinion 362 which meshes with the input ring gear 356. In order, therefore, for the pinion 362 to achieve the necessary counterclockwise rotation imparted thereto by the pinion 360, it is mandatory for the carrier 340 to rotate clockwise at an even faster rate. The rotation of the carrier 340 thus imparted by the rotation of the pinion 360 resulting from the driving rotation of the ring gear 356 as it forces a reaction of the pinion 360 with the grounded sun gear 332 is compounded by the additional translation of the pinion 360 required as the carrier 340 rotates to permit the pinion 362 to rotate against the input ring gear 356. The resulting rotations of the pinions 360 and 362 are necessitated by the grounded sun gear 332. The aforesaid actuation of the input clutch member 328D in conjunction with the maintained actuation of the reaction brake member 338A results in a relatively high speed clockwise rotation of the output ring gear 350, thus achieving the second overdrive for the transmission 310.

To establish the reverse ratio, the previously engaged torque transfer devices 326 are disengaged, and the input clutch member 328A as well as the reaction brake member 338B are simultaneously engaged. Actuation of the input clutch member 328A imparts clockwise rotation to the sun gear 332 which causes counterclockwise rotation of the pinion 362. Actuation of the reaction brake member 338B grounds the carrier 340 such that the pinion 362 is prevented from translating, thereby inducing counterclockwise rotation of the output ring gear 350. As such, the output shaft 318 rotates in a direction opposite to the rotation of the input shaft 314, and with a relatively high torque.

From the foregoing description of the various embodiments, it should be evident that one ring gear 50, 150, 250, 350 is always the output member, while one sun gear 32, 132, 232, 332 and the carrier 40, 140, 240, 340 are each always connected with a pair of selectively engageable torque transfer devices, one of which is a clutch and the other of which is a brake. The remaining planetary members, the other sun gear and ring gear, are always each respectively connected with a selectively engageable torque transfer device which can be either a clutch or a brake. Thus, a wide latitude of design possibilities are presented so that the transmission can be tailored to specific needs and packaging arrangements.

While only the embodiment of FIG. 1 describes the use of a one-way torque transfer mechanism, each of the other embodiments can utilize such a mechanism for controlling the carrier as a reaction member in the low speed ratio. The gearing arrangements, therefore, can be provided with two, three or four clutches and four, three or two brakes in combinations that total six torque transfer devices. This is the minimum of control elements or torque transfer devices which will provide at least five forward speeds and at least one reverse speed with a compound arrangement wherein a ring gear output member and sun gear - carrier input/reaction members are employed.

Obviously, many modifications and variations of the present invention are possible in light of the above teachings. It is, therefore, to be understood that within the scope of the appended claims the invention may be practiced otherwise than as specifically described, and as should now be apparent, the present invention not only teaches that an automatic, five speed, epicyclic transmission embodying the concepts of the present invention can be achieved by uniquely compounding two planetary gear sets, but also that the other objects of the invention can be accomplished.

The embodiments of the invention in which an exclusive property or privilege is claimed are defined as follows:

1. A five speed epicyclic transmission assembly comprising: a housing an input means and an output means; a pair of axially spaced sun gears rotatably mounted in said housing; a pair of axially spaced ring gears rotatably mounted in said housing and being axially aligned with and encircling respective ones said sun gear; one said ring gear operatively secured to said output means; a carrier rotatably mounted in said housing; a plurality of pinions supported from said carrier for rotation independently of said carrier and for translation when said carrier is rotated; said pinions being grouped in at least pairs, said grouped pinions being meshingly engaged; at least one pinion engaging each said ring gear and one of said pinions being disposed in direct meshing relation with the sun gear and the ring gear axially spaced therefrom; at least one pinion engaging each said sun gear; at least six torque transfer devices; said torque transfer devices including at least two input clutch means selectively to connect said input means with at least one of said sun gears and said carrier; and, said torque transfer devices also including at least two reaction brake means selectively to ground at least said carrier and one sun gear to said housing.

2. A five speed epicyclic transmission assembly, as set forth in claim 1, wherein: said six torque transfer devices include three input clutch means and three reaction brake means; each of said sun gears may be selectively interconnected to said input means through input clutch means; and, one of said ring gear other than that which is connected to said output means may be relatively grounded to said housing through a reaction brake means.

3. A five speed epicyclic transmission assembly, as set forth in claim 1, wherein: said six torque transfer devices include three input clutch means and two reaction brake means; each of said sun gears may be selectively interconnected to said input means through input clutch means; and, one of said ring gears other than that which is connected to said output means may be selectively interconnected to said input means through one of said input clutch means.

4. An epicyclic transmission having compound, planetary gear sets to provide five forward ranges and a reverse range, said transmission comprising: a common housing; each planetary gear set having a sun gear; each planetary gear set also having a ring gear with the ring gear of each set being radially and axially aligned with the respective sun gear of each planetary gear set; a plurality of pinion gears operatively connected to a common carrier and including at least one pinion gear directly meshingly connected between the sun gear of one planetary gear set and the ring gear of the other planetary gear set; said sun and ring gears of said compound planetary gear sets interconnected by said pinion gears presented from said common carrier; six, torque transfer devices in the nature of input clutch means selectively to effect a driving connection between relatively rotatable members and reaction brake means selectively to preclude rotation of an otherwise rotatable member by grounding said member to said housing; said torque transfer devices including at least two input clutch means and two reaction brake means; an input means and an output means; said input means selectively connected to one or more of said input clutch means; said sun gear in one of said planetary gear sets operatively connected to at least one of said input clutch means; said sun gear in the other planetary gear set operatively connected to at least one of said input clutch means as well as to one of said reaction brake means; said carrier operatively connected to one of said clutch means and one of said reaction brake means; and, said ring gear in one of said planetary gear sets connected to said output mans.

5. An epicyclic transmission, as set forth in claim 4, wherein: at least a second pinion drivingly engages said first pinion and the other said sun gear; and, at least a third pinion drivingly engages said first pinion and the other said ring gear.

6. An epicyclic transmission, as set forth in claim 4, wherein: at least a second pinion drivingly engages said sun and ring gears in the other planetary gear set; and, said first and second pinions are drivingly interconnected.

7. A multi-speed planetary transmission comprising, input means; output means; housing means for providing a stationary element compound planetary gear element; means arranged between said input means and said output means for providing a plurality of gear ratios therebetween, the planetary gear means comprising: a first ring gear continuously drivingly connected to said output means, an input/reaction carrier means includes a plurality of intermeshing pinion gears with one of the pinion gears meshing with said first ring gear means, an input/reaction sun gear means drivingly connected with said input/reaction carrier means, a second ring gear means drivingly connected with said input/reaction carrier means and being axially and radially aligned with said input/reaction sun gear means and meshing with said one pinion gear, and sun gear means drivingly connected with said input/reaction carrier means and being axially and radially aligned with said first ring gear; first and second selectively operable torque transfer means for selectively operatively connecting said input/reaction carrier means with said input means and said housing means, respectively; third and fourth selectively operable torque transfer means for selectively operatively connecting said input/reaction sun gear means with said input means and said housing means, respectively; fifth selectively operable torque transfer means for selectively operatively connecting said second ring gear means with one of said input means and said housing means; and sixth selectively operable torque transfer means for selectively operatively connecting said sun gear means with one of said input means and said housing means, said torque transfer means being selectively controllable in combination to provide at least five forward gear ratios and one reverse gear ratio in said compound planetary gear means.

8. The multi-speed transmission defined in claim 7, wherein said fifth and sixth torque transfer means are selectively engageable brake means operatively connected with said housing means.

9. The invention defines in claim 7, wherein one of said fifth and sixth torque transfer means is a selectively engageable brake means operatively connected with said housing means and the other is a selectively engageable clutch means operatively connected with said input means.

10. The invention defined in claim 7, wherein both of said fifth and sixth torque transfer means are selectively engageable clutch means operatively connected with said input means.

* * * * *